United States Patent
Tsujie

(10) Patent No.: US 12,000,029 B2
(45) Date of Patent: Jun. 4, 2024

(54) TITANIUM COPPER FOIL, EXTENDED COPPER ARTICLE, ELECTRONIC DEVICE COMPONENT, AND AUTO-FOCUS CAMERA MODULE

(71) Applicant: JX Metals Corporation, Tokyo (JP)

(72) Inventor: Kenta Tsujie, Kanagawa (JP)

(73) Assignee: JX Metals Corporation, Tokyo (JP)

( * ) Notice: Subject to any disclaimer, the term of this patent is extended or adjusted under 35 U.S.C. 154(b) by 540 days.

(21) Appl. No.: 17/291,706

(22) PCT Filed: Aug. 20, 2019

(86) PCT No.: PCT/JP2019/032487
§ 371 (c)(1),
(2) Date: May 6, 2021

(87) PCT Pub. No.: WO2020/095509
PCT Pub. Date: May 14, 2020

(65) Prior Publication Data
US 2022/0002841 A1  Jan. 6, 2022

(30) Foreign Application Priority Data

Nov. 9, 2018 (JP) .................................. 2018-211783

(51) Int. Cl.
*C22C 9/00* (2006.01)
*C22F 1/08* (2006.01)
(Continued)

(52) U.S. Cl.
CPC .................. *C22C 9/00* (2013.01); *C22F 1/08* (2013.01); *G02B 7/09* (2013.01); *G03B 13/36* (2013.01)

(58) Field of Classification Search
None
See application file for complete search history.

(56) References Cited

U.S. PATENT DOCUMENTS

2004/0042928 A1  3/2004 Sasaki et al.
2004/0166017 A1  8/2004 Caron et al.
(Continued)

FOREIGN PATENT DOCUMENTS

CN   104487600 A   4/2015
CN   110218899 A   9/2019
(Continued)

OTHER PUBLICATIONS

English Translation of JP 2012-097305 (originally published May 24, 2012), obtained from PE2E search.*
(Continued)

*Primary Examiner* — George Wyszomierski
(74) *Attorney, Agent, or Firm* — MARSHALL, GERSTEIN & BORUN LLP

(57) ABSTRACT

Provided is a titanium copper foil which has required high strength when used as a spring, and has improved etching uniformity, and which can be suitably used as a conductive spring material for use in electronic device parts such as autofocus camera modules. The titanium copper foil contains from 1.5 to 5.0% by mass of Ti and from 10 to 3000 pm by mass of Fe, the balance being Cu and inevitable impurities, wherein the titanium copper foil has crystal orientation having A of from 10 to 40, in which A is represented by the following equation (1) when measuring a rolled surface by an X-ray diffraction method:

$$A = \beta\{220\}/(\beta\{200\}+\beta\{311\}) \qquad \text{Equation (1)}$$

in which the $\beta\{220\}$, the $\beta\{200\}$, and the $\beta\{311\}$ represent half-value widths of X-ray diffraction peaks at a {220} crystal plane, a {200} crystal plane, and a {311} crystal plane, respectively.

9 Claims, 4 Drawing Sheets

(51) Int. Cl.
  *G02B 7/09* (2021.01)
  *G03B 13/36* (2021.01)

(56) References Cited

U.S. PATENT DOCUMENTS

| | | | |
|---|---|---|---|
| 2005/0121320 A1* | 6/2005 | Okabe | C22C 9/01 |
| | | | 148/411 |
| 2010/0132851 A1 | 6/2010 | Gao et al. | |
| 2010/0139822 A1* | 6/2010 | Gao | C22C 1/11 |
| | | | 148/435 |
| 2016/0062074 A1 | 3/2016 | Nagano | |
| 2016/0062212 A1* | 3/2016 | Nagano | G03B 3/10 |
| | | | 428/606 |
| 2016/0304990 A1 | 10/2016 | Horie | |

FOREIGN PATENT DOCUMENTS

| | | |
|---|---|---|
| JP | 2002-356726 A | 12/2002 |
| JP | 2004-091871 A | 3/2004 |
| JP | 2004-280031 A | 10/2004 |
| JP | 2009/115895 A | 5/2009 |
| JP | 2010-126777 A | 6/2010 |
| JP | 2011-208243 A | 10/2011 |
| JP | 2012-097305 A | 5/2012 |
| JP | 2014-037613 A | 2/2014 |
| JP | 2014/074193 A | 4/2014 |
| JP | 2014/080670 A | 5/2014 |
| JP | 2014-173145 A | 9/2014 |
| JP | 2015/098622 A | 5/2015 |
| JP | 2015-127438 A | 7/2015 |
| JP | 2016/050341 A | 4/2016 |
| JP | 2017-179566 A | 10/2017 |
| JP | 2017-179570 A | 10/2017 |
| WO | WO-2004/024964 A2 | 3/2004 |

OTHER PUBLICATIONS

English Translation of JP 2014-037613 (originally published Feb. 27, 2014), obtained from PE2E search.*
English Translation of JP 2014-080670 (originally published May 8, 2014), obtained from PE2E search.*
Extended European Search Report in EP Application No. 19883007.7 dated Nov. 29, 2021, 7 pages.
International Preliminary Report on Patentability and Written Opinion in International Application No. PCT/JP2019/032487 dated May 20, 2021.
Search Report in International Application No. PCT/JP2019/032487 dated Nov. 26, 2019, 2 pages.
Office Action in CN Application No. 201980068175.7 dated Nov. 17, 2021, 10 pages.

* cited by examiner

TITANIUM COPPER FOIL, EXTENDED COPPER ARTICLE, ELECTRONIC DEVICE COMPONENT, AND AUTO-FOCUS CAMERA MODULE

FIELD OF THE INVENTION

The present invention relates to a titanium copper foil, a copper rolled product, electronic device part, and an autofocus camera module. More particularly, it relates to a titanium copper foil, a copper rolled product, electronic device part, and an autofocus camera module, which are suitable for use as a conductive spring material, in particular for autofocus camera modules and the like.

BACKGROUND OF THE INVENTION

An electronic device part called an autofocus camera module is used in camera lens sections for mobile phones. An autofocus function of a camera for a mobile phone moves a lens in a fixed direction by spring force of a material used for an autofocus camera module, while moving the lens in a direction opposite to the spring force-acting direction by means of electromagnetic force generated by passing an electric current through a coil wound around the periphery. By such a mechanism, the camera lens is driven to exert the autofocus function (for example, Patent Literatures 1 and 2).

Therefore, a copper alloy foil for use in spring members of the autofocus camera modules requires spring strength sufficient to withstand deformation of the material due to the electromagnetic force. If the spring strength is low, the material cannot withstand displacement due to the electromagnetic force, and permanent deformation (settling) will occur so that the copper alloy foil cannot return to its initial position after unloading the electromagnetic force. If the settling occurs, the lens cannot move to a desired position and the autofocus function cannot be produced, when a constant current is passed.

For the autofocus camera modules, Cu—Ni—Sn based copper alloy foils having a foil thickness of 0.1 mm or less and tensile strength or 0.2% yield strength of 1100 MPa or more have been used. However, a recent demand for cost reduction has led to the use of titanium copper foils which have relatively low raw material costs than the Cu—Ni—Sn based copper alloy foils, and the demand for the titanium copper foil is thus increasing.

On the other hand, the strength of the titanium copper foil is lower than that of the Cu—Ni—Sn based copper alloy foil, causing a problem that settling occurs. Therefore, there is a need for increasing the strength of the titanium copper foil.

Means for increasing the strength of titanium copper includes, for example, those described in Patent Literatures 3 and 4. Patent Literature 3 discloses a method for producing titanium copper through the steps of a solutionizing treatment, a sub-aging treatment, cold rolling, and an aging treatment, in which a heat treatment after the solutionizing treatment is divided into two stages, thereby increasing a range of Ti concentration (concentration difference) due to spinodal decomposition and improving a balance between strength and bending workability. Patent Literature 4 also discloses that it is effective to increase the fluctuation of Ti concentration by a method for producing titanium copper through the steps of a solutionizing treatment, a preliminary aging treatment, an aging treatment, finish rolling, and strain relief annealing.

Other techniques for further improving the strength of titanium copper include those described in Patent Literatures 5 to 8. Patent Literature 5 discloses a method of adjusting an average crystal grain size by final recrystallization annealing, and then carrying out cold rolling and an aging treatment in this order. Patent Literature 6 discloses that cold rolling, an aging treatment and cold rolling are sequentially carried out after a solutionizing treatment. Patent Literature 7 discloses a method of adjusting an X-ray diffraction intensity of a {420} crystal plane on a plate surface by sequentially carrying out hot rolling and cold rolling, followed by a solutionizing treatment in which a temperature is maintained in a temperature range of from 750 to 1000° C. for 5 seconds to 5 minutes, and followed by cold rolling at a rolling ratio of 0 to 50%, an aging treatment at 300 to 550° C. and finish cold rolling at a rolling ratio of 0 to 30%. Patent Literature 9 discloses a method of adjusting a half-width of an X-ray diffraction strength of a {220} crystal plane on a rolled surface by sequentially carrying out a first solutionizing treatment, intermediate rolling, a final solutionizing treatment, annealing, final cold rolling, and an aging treatment under predetermined conditions.

Further, in order to suppress generation of settling in addition to the increasing of the strength, Patent Literature 9 discloses a method of controlling a surface roughness of a copper alloy foil by sequentially carrying out hot rolling and cold rolling, followed by a solutionizing treatment, cold rolling at a rolling reduction ratio of 55% or more, an aging treatment at 200 to 450° C. and cold rolling at a rolling reduction ratio of 35% or more. Further, Patent Literature 10 discloses that a ratio $I_{(220)}/I_{(311)}$ is controlled by sequentially carrying out hot rolling and cold rolling, followed by a solutionizing treatment, cold rolling at a rolling reduction ratio of 55% or more, an aging treatment at 200 to 450° C., cold rolling at a rolling reduction ratio of 50% or more, and optionally strain relief annealing, such that the rolling reduction ratio of the cold rolling after the solutionizing treatment is controlled. Each of Patent Literature 9 and Patent Literature 10 discloses that the titanium copper foil can achieve 0.2% yield strength of 1100 MPa or more in a direction parallel to the rolling direction.

Furthermore, Patent Literature 11 discloses that Young's modulus is decreased by carrying out hot rolling at 800 to 1000° C. to a thickness of 5 to 20 mm, cold rolling at a working ratio of 30 to 99%, pre-annealing at a softening degree of 0.25 to 0.75 by maintenance in a temperature range of from 500 to 650° C. for 5 to 80 seconds at an average temperature rising rate of 400 to 500° C. of 1 to 50° C./sec, cold rolling at a rolling reduction ratio of 7 to 50%, a solutionizing treatment at 700 to 900° C. for 5 to 300 seconds, and an aging treatment at 350 to 550° C. for 2 to 20 hours.

Patent Literature 12 discloses a method of improving settling by carrying out hot rolling and cold rolling, and then a solutionizing treatment at 700 to 1000° C. for 5 seconds to 30 minutes and cold rolling at a rolling reduction ratio of 95% or more in this order, and then an aging treatment of increasing a temperature at a rate of 15° C./h or less, maintaining the temperature in a range of from 200 to 400° C. for 1 to 20 hours, and decreasing the temperature to 150° C. at a rate of 15° C./h or less. Patent Literature 12 also discloses that the titanium copper foil can achieve a 0.2% yield stress of 1200 MPa or more in both a direction parallel to the rolling direction and a direction perpendicular to the rolling direction, and a spring deflection limit of 800 MPa or more in both a direction parallel to the rolling direction and a direction perpendicular to the rolling direction.

Further, as a technique focusing on structural control, Patent Literature 13 discloses a method of improving a balance between strength and conductivity by subjecting a titanium copper having a composition containing Ti in a range of 0.5% by mass or more and 3.5% by mass or less, the balance being Cu and inevitable impurities, to finish rolling at a rolling reduction ratio of more than 90% and an aging treatment to form a lamellar structure after the aging treatment.

CITATION LIST

Patent Literatures

[Patent Literature 1]: Japanese Patent Application Publication No. 2004-280031 A
[Patent Literature 2]: Japanese Patent Application Publication No. 2009-115895 A
[Patent Literature 3]: Japanese Patent Application Publication No. 2015-098622 A
[Patent Literature 4]: Japanese Patent Application Publication No. 2015-127438 A
[Patent Literature 5]: Japanese Patent Application Publication No. 2002-356726 A
[Patent Literature 6]: Japanese Patent Application Publication No. 2004-091871 A
[Patent Literature 7]: Japanese Patent Application Publication No. 2010-126777 A
[Patent Literature 8]: Japanese Patent Application Publication No. 2011-208243 A
[Patent Literature 9]: Japanese Patent Application Publication No. 2014-037613 A
[Patent Literature 10]: Japanese Patent Application Publication No. 2014-080670 A
[Patent Literature 11]: Japanese Patent Application Publication No. 2014-074193 A
[Patent Literature 12]: Japanese Patent Application Publication No. 2016-050341 A
[Patent Literature 13]: Japanese Patent Application Publication No. 2014-173145 A

SUMMARY OF THE INVENTION

In recent years, the number of lenses tends to increase due to high functionality of cameras such as the increase in the number of pixels of an image sensor. Therefore, when the camera module falls, a strong force that gives plastic deformation to the material is applied. Accordingly, when the titanium copper foil is used for autofocus modules, strengths are required in three directions parallel to a rolled plane: a direction parallel to a rolling direction, as well as a direction perpendicular to the rolling direction and a direction of 45° relative to the rolling direction.

Further, these titanium copper foils are etched to produce spring materials. However, when the spring materials are produced by rolling at a rolling reduction ratio of 95% or more as in the conventional high strength titanium copper foils, the etching in the above three directions may vary. The variation in the etching makes it difficult to develop good springiness for a camera module. Therefore, it is desirable that the variation is as small as possible.

It should be noted that Patent Literature 1 to 13 do not describe control of strength and variation in etching in three directions.

In view of the above background, there would be still need for further improvement of the conventional titanium copper foil from the viewpoint of strengths in three directions and a good etching property (etching uniformity).

An object of the present invention is to solve such problems. In one embodiment, an object of the present invention is to provide a titanium copper foil that has required high strength when used as a spring material, has strength in each of directions parallel to the rolling plane: the direction parallel to the rolling direction, the direction perpendicular to the rolling direction and the direction of 45° relative to the rolling direction, and has improved etching uniformity. In another embodiment, an object of the present invention is to provide a rolled copper product including such a titanium copper foil. In yet another embodiment, an object of the present invention is to provide an electronic device part including such a titanium copper foil. In yet another embodiment, an object of the present invention is to provide an autofocus camera module including such a titanium copper foil.

As a result of studies for effects of miner components and production steps on the strength and etching uniformity of titanium copper, the present inventors have found that the addition of Fe for the miner components, and cold rolling after solutionizing and preliminary aging for a short period of time in the production step, are effective for the strength in each of directions parallel to the rolling plane: the direction parallel to the rolling direction, the direction perpendicular to the rolling direction and the direction of 45° relative to the rolling direction, and for improvement of etching uniformity. The present invention has been completed based on the above findings, and is specified as follows.

Based on such findings, in an aspect, the present invention relates to a titanium copper foil comprising from 1.5 to 5.0% by mass of Ti and from 10 to 3000 pm by mass of Fe, the balance being Cu and inevitable impurities, wherein the titanium copper foil has crystal orientation having A of from 10 to 40, in which A is represented by the following equation (1) when measuring a rolled surface by an X-ray diffraction method:

$$A = \beta\{220\}/(\beta\{200\}+\beta\{311\}) \qquad \text{Equation (1)}$$

in which the $\beta\{220\}$, the $\beta\{200\}$, and the $\beta\{311\}$ represent half-value widths of X-ray diffraction peaks at a {220} crystal plane, a {200} crystal plane, and a {311} crystal plane, respectively.

In an embodiment of the titanium copper foil according to the present invention, the A is from 12 to 38.

In an embodiment, the titanium copper according to the present invention has a tensile strength of 1100 MPa or more in each of directions parallel to a rolling plane: a direction parallel to a rolling direction, a direction perpendicular to the rolling direction and a direction of 45° relative to the rolling direction.

In an embodiment of the titanium copper according to the present invention, a difference between a maximum value and a minimum value of the tensile strengths in the directions parallel to the rolling plane: the direction parallel to the rolling direction, the direction perpendicular to the rolling direction and the direction of 45° relative to the rolling direction is 400 MPa or less.

In an embodiment, the titanium copper foil according to the present invention has a thickness of 0.1 mm or less.

In an embodiment, the titanium copper according to the present invention further comprises one or more elements selected from Ag, B, Co, Mg, Mn, Mo, Ni, P, Si, Cr and Zr in a total amount of 1.0% by mass or less.

In another aspect, the present invention relates to a copper rolled product comprising any one of the titanium copper foils as described above.

In another aspect, the present invention relates to an electronic device part comprising any one of the titanium copper foils as described above.

In an embodiment, the electronic device part is an autofocus camera module.

Further, in yet another aspect, the present invention relates to an autofocusing camera module comprising: a lens; a spring member for elastically biasing the lens to an initial position in an optical axis direction; and an electromagnetic driver configured to generate electromagnetic force for withstanding the biasing force of the spring member so that the lens can be driven in the optical axis direction, wherein the spring member comprises any one of the titanium copper foils as described above.

According to the present invention, it is possible to obtain a Cu—Ti based alloy having improved strength in each of directions parallel to a rolling plane: a direction parallel to a rolling direction, a direction perpendicular to the rolling direction and a direction of 45° relative to the rolling direction and improved etching uniformity, which can be suitably used as a conductive spring material for use in electronic device parts such as autofocus camera modules.

DETAILED DESCRIPTION OF THE INVENTION

Figure 1:
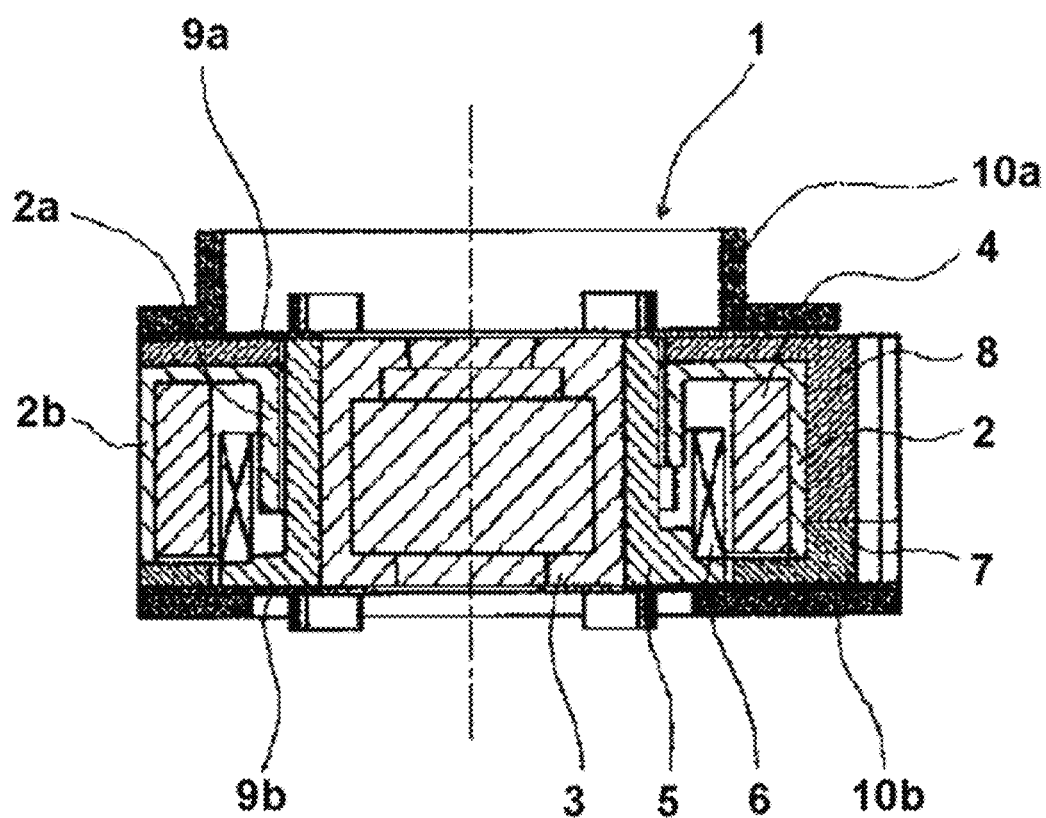
FIG. 1 is a cross-sectional view showing an example of autofocus camera modules according to the present invention.

Hereinafter, specific embodiments of the present invention will be described in detail. The present invention is not limited to the following embodiments, and various modifications may be made without changing the spirit of the present invention.

[1. Titanium Copper Foil]

An embodiment of a titanium copper foil according to the present invention contains from 1.5 to 5.0% by mass of Ti and from 10 to 3000 pm by mass of Fe, the balance being Cu and inevitable impurities, wherein the titanium copper foil has crystal orientation having A of from 10 to 40, in which A is represented by the following equation (1) when measuring a rolled surface by an X-ray diffraction method:

$$A = \beta\{220\}/(\beta\{200\}+\beta\{311\}) \quad \text{Equation (1)}$$

in which the $\beta\{220\}$, the $\beta\{200\}$, and the $\beta\{311\}$ represent half-value widths of X-ray diffraction peaks at a $\{220\}$ crystal plane, a $\{200\}$ crystal plane, and a $\{311\}$ crystal plane, respectively.

Hereinafter, examples of suitable conditions for the titanium copper foil will be described.

(Ti Concentration)

In an embodiment, the titanium foil copper according to the present invention has a Ti concentration of from 1.5 to 5.0% by mass. For the titanium copper foil, the strength and conductivity are increased by allowing solid solution of Ti into the Cu matrix with a solutionizing treatment and then dispersing fine precipitates in the alloy with an aging treatment.

The Ti concentration is 1.5% by mass or more, and preferably 1.8% by mass or more, and more preferably 2.0% by mass, from the viewpoint that precipitates are sufficiently deposited to obtain a desired strength. Further, the Ti concentration is 5.0% by mass or less, and preferably 4.8% by mass or less, and more preferably 4.6% by mass or less, from the viewpoint that the material is not easily cracked during rolling because of good workability.

(Fe Concentration)

In one embodiment of the titanium copper foil according to the present invention, it is important to contain from 10 to 3000 ppm by mass of Fe in order to increase an A value as described later. By adding Fe and adjusting each step in the following production method, the titanium copper foil contributes to strength in each of directions parallel to a rolling surface: a direction parallel to a rolling direction, a direction perpendicular to the rolling direction, and a direction of 45° relative to the rolling direction. For example, the Fe concentration is 10 ppm by mass or more, and preferably 15 ppm by mass or more, and more preferably 50 ppm by mass or more, in terms of contribution to the strengths in all of the three directions, and good etching uniformity. However, the Fe concentration is 3000 ppm by mass or less, and preferably 2800 ppm by mass or less, in view of raw material costs.

(Other Additive Elements)

In one embodiment, the strength of the titanium copper foil according to the present invention can be further improved by containing one or more of Ag, B, Co, Mg, Mn, Mo, Ni, P, Si, Cr, and Zr in the total amount of 1.0% by mass or less. However, the total content of these elements may be zero, that is, these elements may not be contained. The reason why the upper limit of the total content of these elements is 1.0% by mass is that if it is more than 1.0% by mass, the workability is deteriorated and the material is easily cracked during rolling. In view of the balance between strength and workability, it is preferable to contain the above elements in the total amount of from 0.005 to 0.5% by mass. It should be noted that in the present invention, the desired effect can be obtained even if the above additive elements are not contained.

Further, an amount of Ag added is preferably 0.5% by mass or less, and more preferably 0.1% by mass or less. An amount of B added is preferably 0.5% by mass or less, and more preferably 0.05% by mass or less. An amount of Co added is preferably 0.5% by mass or less, and more preferably 0.1% by mass or less. An amount of Fe added is preferably 0.5% by mass or less, and more preferably 0.25% by mass or less. An amount of Mg added is preferably 0.5% by mass or less, and more preferably 0.1% by mass or less. An amount of Mn added is preferably 0.1% by mass or less, and more preferably 0.05% by mass or less. An amount of Mo added is preferably 0.5% by mass or less, and more preferably 0.3% by mass or less. An amount of Ni added is preferably 0.5% by mass or less, and more preferably 0.1% by mass or less. An amount of P added is preferably 0.1% by mass or less, and more preferably 0.05% by mass or less. An amount of Si added is preferably 0.1% by mass or less, and more preferably 0.05% by mass or less. An amount of Cr added is preferably 0.5% by mass or less, and more preferably 0.4% by mass or less. An amount of Zr added is preferably 0.5% by mass or less, and more preferably 0.1% by mass or less. However, it is not limited to the above addition amounts.

(Tensile Strength)

In an embodiment, the titanium copper foil according to the present invention can achieve a tensile strength of 1100 MPa or more, or even 1200 MPa or more, in each of directions parallel to a rolling plane: a direction parallel to a rolling direction, a direction perpendicular to a rolling direction, and a direction of 45° relative to the rolling direction. The tensile strength in the direction parallel to the rolling direction of 1200 MPa or more is a desirable characteristic for use as a conductive spring material for autofocus camera modules. In a preferred embodiment, each of the tensile strengths in directions parallel to the rolling plane: the direction parallel to the rolling direction, the direction perpendicular to the rolling direction and the direction of 45° relative to the rolling direction is 1300 MPa or more, and 1400 MPa or more in a more preferred embodiment.

On the other hand, the upper limit of the tensile strength is not particularly limited in terms of the strength intended by the present invention, but the tensile strength in each of the directions parallel to the rolling plane: the direction parallel to the rolling direction, the direction perpendicular to the rolling direction and the direction of 45° relative to the rolling direction is generally 2000 MPa or less, and typically 1800 MPa or less, taking labors and costs into account.

In the present invention, the tensile strength of the titanium copper foil in each of the directions parallel to the rolling plane: the direction parallel to the rolling direction, the direction perpendicular to the rolling direction and the direction of 45° relative to the rolling direction is measured in accordance with JIS Z 2241: 2011 (Metal Material Tensile Test Method).

(Max-Min)

In an embodiment of the titanium copper foil according to the present invention, it is preferable to decrease a difference (MAX-MIN) between a maximum value and a minimum value of the strengths in the directions parallel to the rolling plane: the direction parallel to the rolling direction, the direction perpendicular to the rolling direction and the direction of 45° relative to the rolling direction, in terms of ensuring the uniformity of springiness. The difference between the maximum value and the minimum value (MAX-MIN) is preferably, for example, 400 MPa or less, and more preferably 350 MPa or less, and further preferably 300 MPa or less. However, the lower limit of the difference between the maximum value and the minimum value (MAX-MIN) is not particularly limited, but it is typically 50 MPa or more, and more typically 100 MPa or more.

(X-Ray Diffraction Intensity)

In a preferred embodiment of the titanium copper foil according to the present invention, it is important to adjust the A value represented by the following equation (1) to an appropriate range when measuring a rolled surface by an X-ray diffraction method:

$$A=\beta\{220\}/(\beta\{200\}+\beta\{311\}) \quad \text{Equation (1)}$$

in which, the β{200}, the β{220}, and the β{311} represent half-value widths of X-ray diffraction intensity peaks at a {200} crystal plane, a {220} crystal plane, and a {311} crystal plane, respectively.

In the present invention, the half-value width is indicated by a peak width (2θ) at a position having an intensity of $I_{max}/2$. Values of 2θ corresponding to the β{200} crystal plane, the β{220} crystal plane, and the β{311} crystal plane are from 48.3 to 53.3°, from 56.9 to 61.9°, from 86.5 to 91.5° and from 108.0 to 113°, respectively. The $I_{max}$ (maximum peak intensity (unit: cps)) is a height from a point where cps is zero to the maximum peak intensity after removing the background.

Here, the A value is preferably 10 or more, and preferably 12 or more, and more preferably 14 or more, in terms of improving the etching uniformity. Further, although the upper limit of the A value for obtaining the titanium copper foil of the present invention is not particularly specified, the A value is 40 or less, and preferably 38 or less, and more preferably 35 or less, and even more preferably 25 or less, because any contribution to the etching uniformity is lower in a region where the A value is higher.

The half-value width of the X-ray diffraction integrated intensity peak can be measured by acquiring a diffraction intensity curve for the rolled surface by using an X-ray diffractometer under the following measurement conditions:

Target: Co bulb;
Bulb voltage: 25 kV;
Bulb current: 20 mA;
Scanning speed: 5°/min;
Sampling width: 0.02°; and
Measurement range (2θ): 5° to 150°.

(Etching Uniformity)

The titanium copper foil to be tested is etched with a predetermined etching solution to form a linear circuit having a line width of 100 μm and a length of 150 mm, such that a longitudinal direction of the linear circuit is the direction parallel to the rolling direction of directions parallel to the rolling plane of the titanium copper foil. Similarly, the titanium copper foil to be tested is etched to form a linear circuit having a line width of 100 μm and a length of 150 mm, such that the longitudinal direction of the linear circuit is the direction perpendicular to the rolling direction of the directions parallel to the rolling plane of the titanium copper foil. Similarly, the titanium copper foil to be tested is etched to form a linear circuit having a line width of 100 μm and a length of 150 mm, such that the longitudinal direction of the linear circuit is the direction of 45° relative to the rolling direction of the directions parallel to the rolling plane of the titanium copper foil. Each linear circuit after each etching is observed with a scanning electron microscope (SEM). To confirm the etching uniformity, circuit widths W at 10 arbitrarily selected positions in each linear circuit are measured, and a process capability index Cpk is measured by the following equation (2). The Cpk is preferably 1.00 or more, and more preferably 1.33 or more, from the viewpoint of ensuring etching uniformity.

$$Cpk=(W_{MAX}-W_{MIN})/6\sigma \quad \text{Equation (2)}$$

in which $W_{MAX}$ is a maximum circuit width, $W_{MIN}$ is a minimum circuit width, and σ is a standard deviation of the circuit widths.

(Thickness of Titanium Copper Foil)

The titanium copper foil according to the present invention has, for example, a thickness of 0.1 mm or less, and a thickness of from 0.018 mm to 0.08 mm in a typical embodiment, and a thickness of from 0.02 mm to 0.06 mm in a more typical embodiment.

[2. Method for Producing Titanium Copper Foil]

Hereinafter, an example of conditions of a suitable method for producing the titanium copper foil according to the present invention will be described. In the production process for the titanium copper foil according to the present invention, raw materials such as electrolytic copper and Ti are first melted in a melting furnace to obtain a molten metal having a desired composition. The molten metal is then cast into an ingot. In order to prevent oxidative wear of titanium, the melting and casting are preferably carried out in vacuum or in an inert gas atmosphere. The ingot is then subjected to hot rolling, cold rolling 1, a solutionizing treatment, cold rolling 2, an aging treatment 1 (preliminary aging), cold rolling 3, and an aging treatment 2 (main aging) in this order to finish the ingot in the form of a foil having desired thickness and properties. Of course, the ingot may be finished into a strip in addition to the foil by the above method.

The hot rolling and the subsequent cold rolling 1 may be carried out under the customary conditions used in the method for producing titanium copper foil, and there are no special requirements herein. Further, the next solutionizing treatment step may also be carried out under conventional conditions. For example, this treatment may be carried out, for example, at 700 to 1000° C. for 5 seconds to 30 minutes. Furthermore, the cold rolling 1 carried out before the solutionizing treatment may be omitted in terms of a production efficiency.

A rolling reduction ratio of the cold rolling 2 (hereinafter, also referred to as "first cold rolling") is preferably 54% or less, and more preferably 50% or less, and further preferably 40% or less, and further preferably 30% or less, and even more preferably 20% or less, in terms of suppressing anisotropy in rolling and improving etching uniformity. On the other hand, if the rolling reduction ratio of the cold rolling 2 is lower, any optimum deposition does not occur in the subsequent preliminary aging, and the A value is decreased, so that it will be difficult to obtain the strengths in three directions, and the etching uniformity tends to deteriorate. Therefore, the rolling reduction ratio of the cold rolling 2 is preferably 5% or more, and more preferably 7% or more, and further preferably 9% or more, in terms of strength and etching uniformity.

In addition, the rolling reduction ratio R (%) is defined by the following equation (3):

$$R=\{(t_0-t)/t_0\}\times 100\text{, in which }t_0\text{ is a thickness before rolling, and t is a thickness after rolling.} \qquad \text{Equation (3)}$$

In order to obtain the titanium copper foil as described above, the aging treatment 1 (preliminary aging) is preferably carried out such that a temperature of the aging treatment is from 300 to 400° C., and a Fe concentration and a heating time satisfy the following equation (4). Thus, a titanium copper foil having improved strength and etching uniformity can be produced.

$$-0.2007x+902 \leq y \leq -0.2007x+1802 \qquad \text{Equation (4)}$$

in which x represents the Fe concentration (ppm by mass) and y represents the heating time (seconds).

In order for the titanium copper foil as described above to obtain high strength, it is essential to carry out cold rolling 3 (hereinafter, also referred to as "second cold rolling") after the aging treatment 1, and it is important to control a total rolling reduction ratio represented by the following equation (5):

$$\text{Total rolling reduction ratio (\%)}=((\text{thickness before first cold rolling-thickness after second cold rolling})/\text{thickness before first cold rolling})\times 100 \qquad \text{Equation (5)}$$

The total rolling reduction ratio is preferably 90% or more, and even more preferably 95% or more, in terms of obtaining a tensile strength of 1100 MPa or more. The upper limit of the rolling reduction ratio is not particularly limited from the viewpoint of the strength intended by the present invention. However, it does not exceed 99.8% industrially.

A heating temperature of the finishing aging treatment 2 (main aging) is preferably from 200 to 450° C., and a heating time is preferably from 2 hours to 20 hours. Such an appropriate heating temperature and heating time can provide a tensile strength of 1100 MPa or more.

In general, after the heat treatment, the surface may be washed with an acid or polished to remove an oxide film or an oxide layer formed on the surface. In the present invention, the surface also can be washed with an acid or polished after the heat treatment.

[3. Application]

The titanium copper foil according to the present invention can be suitably used as a material for electronic device parts, including, but not limited to, switches, connectors, jacks, terminals and relays, or as a rolled copper product, in particular as a conductive spring member for use in electronic device parts such as autofocus camera modules.

In one embodiment, the autofocus camera module includes: a lens; a spring member for elastically biasing the lens to an initial position in an optical axis direction; and an electromagnetic drive means configured to generate electromagnetic force for withstanding the biasing force of the spring member so that the lens can be driven in the optical axis direction.

By way of example, the electromagnetic driving means includes: a U-shaped cylindrical yoke; a coil housed inside an inner peripheral wall of the yoke; and a magnet enclosing the coil and housed inside the outer peripheral wall of the yoke.

Figure 2:
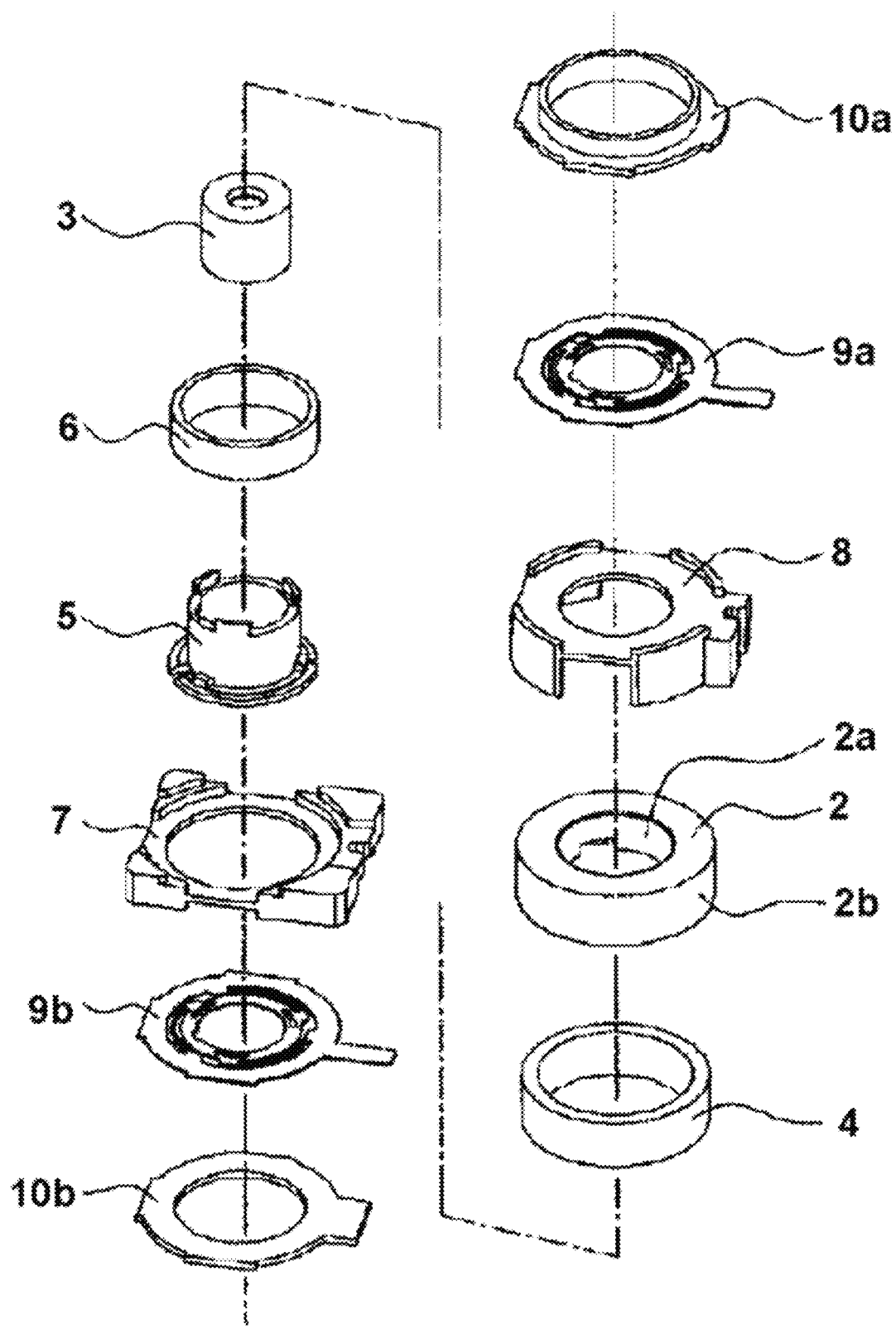
FIG. 2 is an exploded perspective view of the autofocus camera module in FIG. 1.
Figure 3:
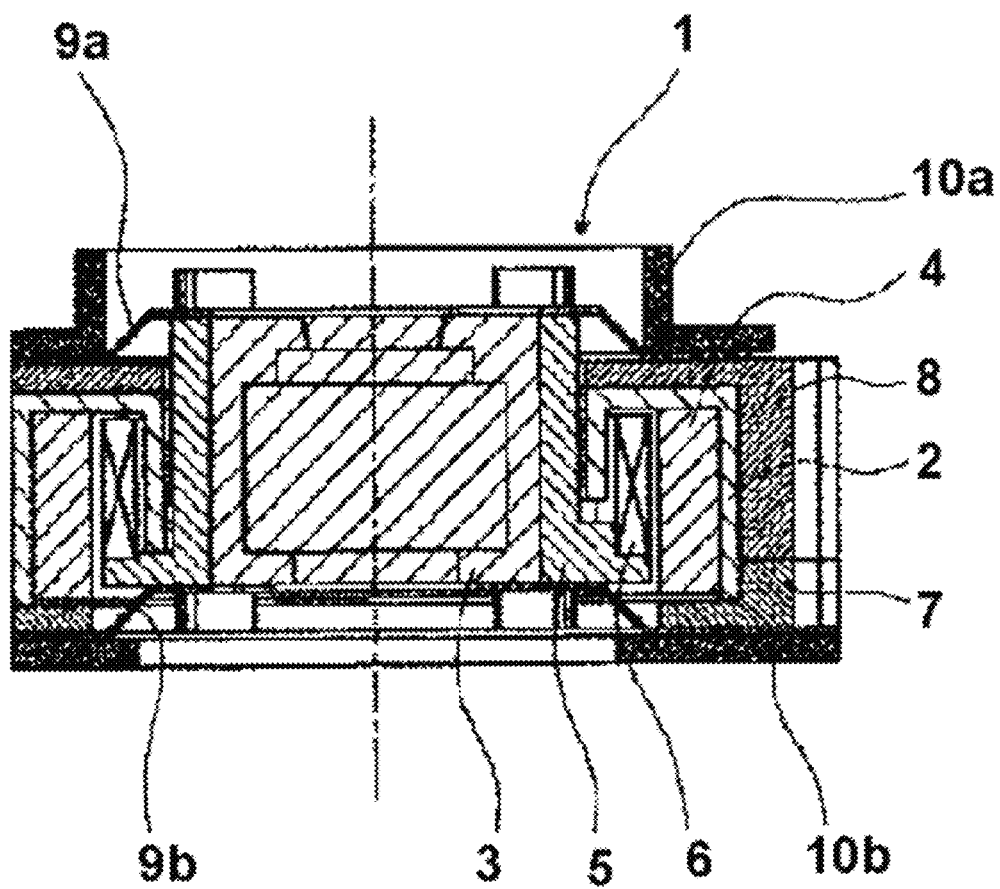
FIG. 3 is a cross-sectional view showing the operation of the autofocus camera module in FIG. 1.

FIG. 1 is a cross-sectional view showing an example of the autofocus camera module according to the present invention, FIG. 2 is an exploded perspective view of the autofocus camera module in FIG. 1, and FIG. 3 is a cross-sectional view showing the operation of the autofocus camera module in FIG. 1.

An autofocus camera module 1 includes: a U-shaped cylindrical yoke 2; a magnet 4 attached to an outer wall of the yoke 2; a carrier 5 provided with a lens 3 in a central position; a coil 6 attached to the carrier 5; a base 7 to which the yoke 2 is attached; a frame 8 supporting the base 7; two spring members 9a, 9b for supporting the carrier 5 at the upper and lower positions; and two caps 10a, 10b covering these upper and lower positions. These two spring member 9a, 9b are the same articles, and support the carrier 5 by holding it from the upper and lower positions in the same positional relationship, while functioning as a power supply route to the coil 6. The carrier 5 moves upward by applying an electric current to the coil 6. It should be noted that the wordings "upper" and "lower" are used herein as needed, and they refer to upper and lower in FIG. 1 and the upper represents a positional relationship that is directed from the camera to a subject.

The yoke 2 is a magnetic material such as soft iron, and assumes a U-shaped cylindrical shape whose upper surface portion is closed, and has cylindrical inner wall 2a and outer wall 2b. A ring-shaped magnet 4 is attached (adhered) to the inner surface of the U-shaped outer wall 2b.

The carrier 5 is a molded product made of a synthetic resin or the like, which has a cylindrical structure with a bottom portion, and the carrier 5 supports the lens in the central position, and binds the pre-formed coil 6 onto the bottom surface outwardly so that the coil 6 is mounted thereon. The yoke 2 is integrated by fitting it to the inner periphery of the base 7 which is a rectangular resin molded article, and the whole yoke 2 is further secured by the frame 8 which is a resin molded article.

The spring members 9a, 9b are fixed by holding their outermost peripheral portions by the frame 8 and the base 7, respectively, and the cutout grooves arranged per 120° on the inner peripheral portion are fitted to the carrier 5 and fixed by thermal caulking or the like.

The spring member 9b and the base 7 as well as the spring member 9a and the frame 8 are fixed by adhesive and thermal caulking, respectively, and further the cap 10b is attached to the bottom surface of the base 7, and the cap 10a is attached to the upper portion of the frame 8, and the spring member 9b is sandwiched between the base 7 and the cap 10b and the spring member 9a is sandwiched between the frame 8 and the cap 10a, so that they are adhered.

The lead wire of one of the coils 6 is extended upward passing through the groove provided on the inner peripheral surface of the carrier 5, and soldered to the spring member 9a. The other lead wire is extended downward passing through the groove provided on the bottom surface of the carrier 5, and soldered to the spring member 9b.

The spring members 9a, 9b are plate springs made of the titanium copper foil according to the present invention. They have spring properties and elastically energize the lens 3 to the initial position in the optical axis direction. At the same time, they also act as power supply paths to the coil 6. One position on the outer peripheral portion of each of the spring members 9a, 9b projects outward, thereby acting as a power supply.

The cylindrical magnet 4 is magnetized in the radial (diameter) direction and forms a magnetic path passing through an inner wall 2a, an upper surface portion and an outer wall 2b of the U-shaped yoke 2, and the coil 6 is disposed in the gap between the magnet 4 and the inner wall 2a.

The spring members 9a, 9b have the same shape, and are attached in the same positional relationship as shown in FIGS. 1 and 2, so that any axial deviation can be suppressed when the carrier 5 is moved upward. Since the coil 6 is manufactured by pressure molding after winding, the accuracy of the finished outer diameter of the coil can be improved, thereby allowing the coil to be easily arranged in a predetermined narrow gap. The carrier 5 is butted to the base 7 at the lowest position and butted to the yoke 2 at the uppermost position, and it will be thus equipped with the butting mechanisms in the upper and bottom vertical direction, thereby preventing any detachment.

FIG. 3 shows a sectional view when upwardly moving the carrier 5 having the lens 3 for the autofocus by applying an electric current to the coil 6. When a voltage is applied to the power supply terminals of the spring members 9a, 9b, the electric current flows through the coil 6, and the upward electromagnetic force acts on the carrier 5. On the other hand, restoring force of two linked spring members 9a, 9b downwardly acts on the carrier 5. Therefore, the distance of upward movement of the carrier 5 will be a position where the electromagnetic force and the restoring force are balanced. This will allow determination of the moving amount of the carrier 5 according to the amount of the electric current applied to the coil 6.

Since the upper spring member 9a supports the upper surface of the carrier 5 and the lower spring member 9b support the lower surface of the carrier 5, the restoring force will equally work downward on the upper and lower surfaces of the carrier 5, so that any axial displacement of the lens 3 can be suppressed.

Therefore, for the upward movement of the carrier 5, no guide by ribs and the like is needed and used. Since there is no sliding friction by the guide, the amount of movement of the carrier 5 will be purely controlled by the balance between the electromagnetic force and the restoring force, thereby achieving the smooth and accurate movement of the lens 3. This will achieve autofocusing with reduced blurring of the lens.

It should be noted that although the magnet 4 has been described as one having the cylindrical shape, the magnet is not limited to this shape, and may be divided 3 to 4 parts and magnetized in the radial direction, which may be fixed by adhering to the inner surface of the outer wall 2b of the yoke 2.

EXAMPLES

Hereinafter, Examples of the present invention will be illustrated, but these Examples are presented in order to provide better understanding of the present invention and its advantages, and in no way intended to limit the present invention.

Each alloy containing the alloy components shown in Tables 1 and 2, the balance being copper and inevitable impurities, was used as an experimental material, and effects of the alloy components and production conditions on the tensile strength and etching uniformity were studied.

<Production Conditions>

First, 2.5 kg of electrolytic copper was melted in a vacuum melting furnace, and alloy elements were added such that each alloy composition as shown in Tables 1 and 2 was obtained. The molten metal was cast into a mold made of cast iron to produce an ingot having a thickness of 30 mm, a width of 60 mm, and a length of 120 mm. The ingot was processed in the following step order to produce each product sample having each predetermined foil thickness as shown in Tables 1 and 2.

(1) Melting Casting: The casting temperature was 1300° C.

(2) Hot Rolling: The above ingot was further heated and held at 950° C. for 3 hours and then rolled to a thickness of 10 mm.

(3) Grinding: The oxide scale produced in hot rolling was removed by a grinder. The thickness after grinding was 9 mm.

(4) Cold rolling 1: The material was rolled to a predetermined thickness depending on the rolling reduction ratios in cold rolling 2 and cold rolling 3 and the thickness of the product sample.

(5) Solutionizing Treatment: The sample was charged with an electric furnace 1 heated to 800° C. and maintained for 5 minutes, and the sample was quenched by placing it in a water bath.

(6) Cold Rolling 2 (first cold rolling): It was rolled at each rolling reduction ratio as shown in Tables 1 and 2 to each predetermined thickness.

(7) Aging Treatment 1 (preliminary aging): A heat treatment was carried out under the conditions of each treatment temperature and each heating time as shown in Tables 1 and 2 depending on the Fe concentrations.

(8) Cold Rolling 3 (second cold rolling): The rolling reduction ratio was adjusted so as to have each total rolling reduction ratio as shown in Tables 1 and 2 (the following equation (5)), and each sample was rolled to a product thickness.

Total rolling reduction ratio (%)=((thickness before first cold rolling−thickness after second cold rolling)/thickness before first cold rolling)×100    Equation (5)

(8) Aging Treatment 2 (main aging): The sample was heated in an Ar atmosphere at a temperature of 300° C. for 2 hours.

The following evaluations were performed for each product sample produced as described above.

<Crystal Orientation>

For each sample, a diffraction intensity curve of a rolled surface was obtained by an X-ray diffractometer (RINT 2500 from Rigaku Corporation) under the measurement conditions as described above, and a half-value width of an X-ray diffraction peak on each of a {200} crystal plane, a {220} crystal plane, and a {311} crystal plane was measured to calculate an A value.

<Tensile Strength>

The tensile strength in each of the directions parallel to the rolling plane: the direction parallel to the rolling direction, the direction perpendicular to the rolling direction, and the direction of 45° relative to the rolling direction was measured in accordance with JIS Z2241: 2011 using a tensile tester.

<Etching Uniformity>

Each sample foil was etched with an aqueous solution having 37% by mass ferric chloride and a Baume degree of 40° to form a linear circuit having a line width of 100 μm and a length of 150 mm such that the longitudinal direction of the linear circuit is a direction parallel to the rolling direction of the directions parallel to the rolling plane of each sample foil. Similarly, the sample foil was etched to form a linear circuit having a line width of 100 μm and a length of 150 mm, such that the longitudinal direction of the linear circuit was the direction of perpendicular to the rolling direction of the directions parallel to the rolling plane of each sample foil. Similarly, the sample foil was etched to form a linear circuit having a line width of 100 μm and a length of 150 mm, such that the longitudinal direction of the linear circuit was the direction of 45° relative to the rolling direction of the directions parallel to the rolling plane of the sample foil.

Each formed circuit was then observed in each direction using a scanning electron microscope (S-4700 from Hitachi) (an observation length of 200 μm), and circuit widths W at arbitrary 10 positions in each linear circuit was measured. Standard deviations of a total of 30 circuit widths measured in the above three directions were calculated to determine a process capability index Cpk represented by the following equation (2). A sample in which Cpk was 1.33 or more was evaluated as "⊚", a sample in which Cpk was 1.00 or more and less than 1.33 was evaluated as "○", and a sample in which CpK was less than 1.00 was evaluated as "×".

$$Cpk = (W_{MAX} - W_{MIN})/6\sigma \quad \text{Equation (2)}$$

in which $W_{MAX}$ is a maximum circuit width, $W_{MIN}$ is a minimum circuit width, and σ is a standard deviation of the circuit widths.

TABLE 1

| | | Alloy Composition | | | First Cold Rolling | Preliminary Aging | | First Cold Rolling + Second Cold Rolling |
|---|---|---|---|---|---|---|---|---|
| Product | Main | | Sub-Component (% by mass) | | Rolling | Treatment | Heating | Total Rolling |
| | Thickness (mm) | Component (% by mass) | Fe (ppm by mass) | Additive Element (% by mass) | Reduction Ratio (%) | Temperature (° C.) | Time (sec) | Reduction Ratio (%) |
| Example 1 | 0.03 | Cu—3.2%Ti | 50 | — | 20 | 350 | 1200 | 98 |
| Example 2 | 0.018 | Cu—3.2%Ti | 50 | — | 20 | 350 | 1200 | 98.8 |
| Example 3 | 0.05 | Cu—3.2%Ti | 50 | — | 20 | 350 | 1200 | 96.7 |
| Example 4 | 0.08 | Cu—3.2%Ti | 50 | — | 20 | 350 | 1200 | 94.7 |
| Example 5 | 0.1 | Cu—3.2%Ti | 50 | — | 20 | 350 | 1200 | 93.3 |
| Example 6 | 0.03 | Cu—3.2%Ti | 50 | — | 10 | 350 | 1200 | 98 |
| Example 7 | 0.03 | Cu—3.2%Ti | 50 | — | 20 | 350 | 1200 | 98 |
| Example 8 | 0.03 | Cu—3.2%Ti | 50 | — | 30 | 350 | 1200 | 98 |
| Example 9 | 0.03 | Cu—3.2%Ti | 1000 | — | 50 | 350 | 1200 | 98 |
| Example 10 | 0.03 | Cu—3.2%Ti | 20 | — | 20 | 350 | 1700 | 98 |
| Example 11 | 0.03 | Cu—3.2%Ti | 100 | — | 20 | 350 | 1500 | 98 |
| Example 12 | 0.03 | Cu—3.2%Ti | 500 | — | 20 | 350 | 1600 | 98 |
| Example 13 | 0.03 | Cu—3.2%Ti | 2000 | — | 20 | 350 | 1300 | 98 |
| Example 14 | 0.03 | Cu—3.2%Ti | 2500 | — | 20 | 350 | 600 | 98 |
| Example 15 | 0.03 | Cu—3.2%Ti | 100 | 0.4% Cr | 20 | 350 | 1200 | 98 |
| Example 16 | 0.03 | Cu—3.2%Ti | 120 | 0.5% Mo | 20 | 350 | 1200 | 98 |
| Example 17 | 0.03 | Cu—3.2%Ti | 80 | 0.1% Mg + 0.1% Mn | 20 | 350 | 1000 | 98 |
| Example 18 | 0.03 | Cu—3.2%Ti | 700 | 0.1% Zr + 0.1% Si | 20 | 350 | 1200 | 98 |
| Example 19 | 0.03 | Cu—3.2%Ti | 2800 | 0.1% Ni + 0.1% Co | 20 | 350 | 1200 | 98 |
| Example 20 | 0.03 | Cu—3.2%Ti | 1500 | 0.1% Ag + 0.1% P | 20 | 350 | 900 | 98 |
| Example 21 | 0.03 | Cu—3.2%Ti | 2300 | 0.05% B | 20 | 350 | 700 | 98 |
| Example 22 | 0.03 | Cu—1.6%Ti | 50 | — | 20 | 350 | 1200 | 98 |
| Example 23 | 0.03 | Cu—2.5%Ti | 50 | — | 20 | 350 | 1200 | 98 |
| Example 24 | 0.03 | Cu—3.4%Ti | 50 | — | 20 | 350 | 1200 | 98 |
| Example 25 | 0.03 | Cu—4.0%Ti | 50 | — | 20 | 350 | 1200 | 98 |
| Example 26 | 0.03 | Cu—4.4%Ti | 50 | — | 20 | 350 | 1200 | 98 |
| Example 27 | 0.03 | Cu—3.2%Ti | 50 | — | 40 | 350 | 1200 | 90 |

TABLE 2

| | Product Thickness (mm) | Alloy Composition Main Component (% by mass) | Sub-Component (% by mass) Fe (ppm by mass) | Sub-Component (% by mass) Additive Element (% by mass) | First Cold Rolling Rolling Reduction Ratio (%) | Preliminary Aging Treatment Temperature (° C.) | Preliminary Aging Heating Time (sec) | First Cold Rolling + Second Cold Rolling Total Rolling Reduction Ratio (%) |
|---|---|---|---|---|---|---|---|---|
| Comp. 1  | 0.03 | Cu—3.2%Ti | 50   | — | 4  | 350 | 1200 | 98 |
| Comp. 2  | 0.03 | Cu—3.2%Ti | 50   | — | 60 | 350 | 1200 | 98 |
| Comp. 3  | 0.03 | Cu—3.2%Ti | 50   | — | 20 | 350 | 2000 | 98 |
| Comp. 4  | 0.03 | Cu—3.2%Ti | 1000 | — | 20 | 350 | 1800 | 98 |
| Comp. 5  | 0.03 | Cu—3.2%Ti | 2500 | — | 20 | 350 | 1500 | 98 |
| Comp. 6  | 0.03 | Cu—3.2%Ti | 50   | — | 20 | 350 | 800  | 98 |
| Comp. 7  | 0.03 | Cu—3.2%Ti | 1000 | — | 20 | 350 | 600  | 98 |
| Comp. 8  | 0.03 | Cu—3.2%Ti | 2500 | — | 20 | 350 | 300  | 98 |
| Comp. 9  | 0.03 | Cu—3.2%Ti | 50   | — | 20 | 280 | 1200 | 98 |
| Comp. 10 | 0.03 | Cu—3.2%Ti | 50   | — | 20 | 420 | 1200 | 98 |
| Comp. 11 | 0.03 | Cu—3.2%Ti | 5    | — | 20 | 350 | 1200 | 98 |
| Comp. 12 | 0.03 | Cu—3.2%Ti | 50   | 0.1% Si + 0.2% Ni + 0.5% Zr + 0.5% Mg | Cracks occured during rolling | | | |
| Comp. 13 | 0.03 | Cu—1.4%Ti | 50   | — | 20 | 350 | 1200 | 98 |
| Comp. 14 | 0.03 | Cu—5.1%Ti | 50   | — | Cracks occured during rolling | | | |
| Comp. 15 | 0.03 | Cu—3.2%Ti | —    | — | —  | —   | —    | 98 |
| Comp. 16 | 0.03 | Cu—3.2%Ti | —    | — | 20 | 350 | 1200 | 98 |

TABLE 3

| | A Value | Tensile Strength (MPa) Parallel Direction | Tensile Strength (MPa) Perpendicular Direction | Tensile Strength (MPa) 45° Direction | Difference of MAX Value − Min Value | Etching Uniformity Evaluation Results |
|---|---|---|---|---|---|---|
| Example 1  | 21 | 1462 | 1612 | 1529 | 150 | ◎ |
| Example 2  | 21 | 1482 | 1671 | 1494 | 189 | ◎ |
| Example 3  | 20 | 1420 | 1610 | 1418 | 192 | ◎ |
| Example 4  | 17 | 1398 | 1620 | 1430 | 222 | ○ |
| Example 5  | 15 | 1382 | 1622 | 1544 | 240 | ◎ |
| Example 6  | 12 | 1120 | 1365 | 1211 | 245 | ◎ |
| Example 7  | 18 | 1320 | 1570 | 1400 | 250 | ◎ |
| Example 8  | 20 | 1426 | 1612 | 1520 | 186 | ◎ |
| Example 9  | 38 | 1433 | 1620 | 1493 | 187 | ◎ |
| Example 10 | 17 | 1330 | 1450 | 1377 | 120 | ◎ |
| Example 11 | 19 | 1413 | 1652 | 1444 | 239 | ◎ |
| Example 12 | 20 | 1420 | 1642 | 1532 | 222 | ◎ |
| Example 13 | 21 | 1439 | 1671 | 1494 | 232 | ◎ |
| Example 14 | 22 | 1454 | 1611 | 1502 | 157 | ◎ |
| Example 15 | 20 | 1432 | 1676 | 1522 | 244 | ◎ |
| Example 16 | 21 | 1446 | 1662 | 1545 | 216 | ◎ |
| Example 17 | 16 | 1427 | 1630 | 1521 | 203 | ◎ |
| Example 18 | 21 | 1458 | 1643 | 1548 | 185 | ◎ |
| Example 19 | 21 | 1423 | 1662 | 1533 | 239 | ◎ |
| Example 20 | 23 | 1417 | 1687 | 1527 | 270 | ○ |
| Example 21 | 22 | 1439 | 1639 | 1518 | 200 | ◎ |
| Example 22 | 17 | 1120 | 1302 | 1198 | 182 | ◎ |
| Example 23 | 19 | 1232 | 1402 | 1321 | 170 | ◎ |
| Example 24 | 22 | 1432 | 1698 | 1502 | 266 | ○ |
| Example 25 | 21 | 1513 | 1720 | 1610 | 207 | ◎ |
| Example 26 | 21 | 1555 | 1670 | 1620 | 115 | ◎ |
| Example 27 | 11 | 952  | 1153 | 986  | 201 | ◎ |

TABLE 4

| | A Value | Tensile Strength (MPa) | | | | Etching Uniformity Evaluation Results |
| --- | --- | --- | --- | --- | --- | --- |
| | | Parallel Direction | Perpendicular Direction | 45° Direction | Difference of MAX Value − Min Value | |
| Comp. 1 | 9 | 1352 | 1420 | 1020 | 400 | X |
| Comp. 2 | 41 | 1480 | 1680 | 1320 | 360 | X |
| Comp. 3 | 7 | 1420 | 1523 | 1053 | 470 | X |
| Comp. 4 | 9 | 1402 | 1520 | 1090 | 430 | X |
| Comp. 5 | 8 | 1396 | 1520 | 1082 | 438 | X |
| Comp. 6 | 9 | 1402 | 1580 | 1080 | 500 | X |
| Comp. 7 | 8 | 1432 | 1560 | 1050 | 510 | X |
| Comp. 8 | 9 | 1456 | 1502 | 1040 | 462 | X |
| Comp. 9 | 7 | 1450 | 1400 | 1080 | 370 | X |
| Comp. 10 | 9 | 1432 | 1560 | 1050 | 510 | X |
| Comp. 11 | 9 | 1457 | 1572 | 1091 | 481 | X |
| Comp. 12 | — | — | — | — | — | — |
| Comp. 13 | 11 | 750 | 1102 | 979 | 352 | X |
| Comp. 14 | — | — | — | — | — | — |
| Comp. 15 | 7 | 1453 | 1600 | 1090 | 510 | X |
| Comp. 16 | 6 | 1420 | 1580 | 1088 | 492 | X |

Figure 4:
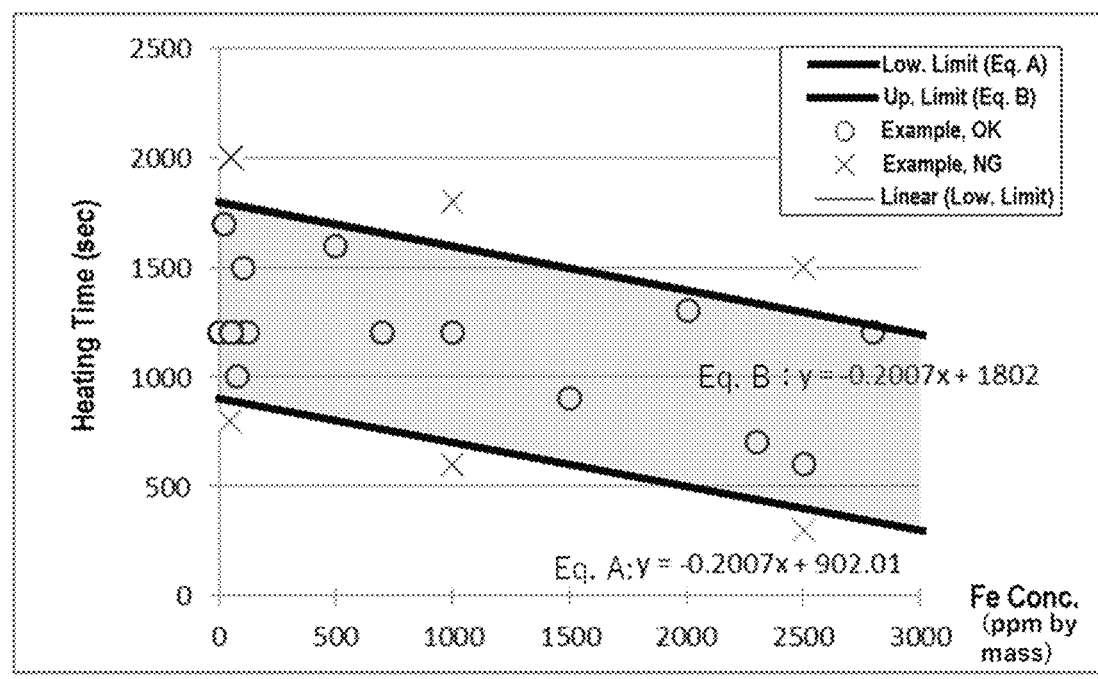
FIG. 4 is a view showing a relationship between a Fe concentration and a heating time during an aging treatment in each of Examples and Comparative Examples.

The test results of the respective samples are shown in Tables 3 and 4. Further, FIG. 4 shows a correlation between the Fe concentration and the heating time in the preliminary aging for each of Examples and Comparative Examples.

Each of Examples 1 to 27 had a good tensile strength in each of the directions parallel to the rolling plane: the direction parallel to the rolling direction, the direction perpendicular to the rolling direction, and the direction of 45° relative to the rolling direction, and good etching uniformity. Further, in each Examples 1 to 27, the heating time satisfied the following equation (4) for the preliminary aging treatment conditions.

$$-0.2007x+902 \leq y \leq -0.2007x+1802 \quad \text{Equation (4)}$$

in which x represents the Fe concentration (ppm by mass) and y represents the heating time (sec).

Each of Examples 1 to 26 had an A value of 10 or more, so that each strength in each of the directions parallel to the rolling plane: the direction parallel to the rolling direction, the direction perpendicular to the rolling direction, and the direction of 45° relative to the rolling direction was 1100 MPa or more, and excellent etching uniformity was obtained.

In Example 27, the rolling reduction ratio during the cold rolling 3 was lower, so that the strength in each of the directions parallel to the rolling plane: the direction parallel to the rolling direction, the direction perpendicular to the rolling direction, and the direction of 45° relative to the rolling direction was less than 1100 MPa. However, the A value was more than 10, so that the etching uniformity was good.

In Comparative Example 1, the rolling reduction ratio during the cold rolling 2 was lower, so that the A value was less than 10, whereby the strength in the direction of 45° relative to the rolling direction of the directions parallel to the rolling plane was not 1100 MPa or more. Also, the etching uniformity was deteriorated due to generation of anisotropy.

In Comparative Example 2, the rolling reduction ratio before the preliminary aging was higher, so that anisotropy was generated and the etching uniformity was deteriorated.

In Comparative Examples 3 to 10, the preliminary aging was insufficient or excessive, so that the A value was less than 10, and the strength in the direction of 45° relative to the rolling direction of the directions parallel to the rolling plane, was lower than in the other directions. Also, the etching uniformity was deteriorated.

In Comparative Example 11, the Fe concentration in the matrix was lower and sufficient deposition was not obtained by the preliminary aging. Therefore, the A value was less than 10, and the strength in the direction of 45° respective to the rolling direction of the directions parallel to the rolling plane was lower than in other directions. Also, the etching uniformity was deteriorated.

In Comparative Example 12, the total amount of the sub-components was more than 1.0% by mass, so that cracks occurred in the hot rolling, and the sample could not be prepared and the strength and the etching uniformity could not be evaluated.

In Comparative Example 13, the A value was 10 or more as a result of carrying out appropriate preliminary aging. However, the Ti concentration in the matrix was lower, so that any target strength (each strength in the three directions with respect to the rolling direction≥1100 MPa) could not be obtained.

In Comparative Example 14, the titanium concentration was more than 5%, so that cracks occurred in the hot rolling, and the sample could not be prepared and the strength and etching uniformity could not be evaluated.

In Comparative Example 15, the rolling and preliminary aging after solutionizing were not carried out, so that the A value was less than 10, and the strength in the 45° direction was lower and the etching uniformity was deteriorated.

In Comparative Example 16, the rolling at a rolling reduction ratio of 20% and preliminary aging at 350° C. for 1200 seconds were sequentially carried out after the solutionizing treatment, but since Fe was not added, the A value was less than 10 and the strength in the direction of 45° relative to the rolling direction of the directions parallel to the rolled plane was lower than in the other directions, and the etching uniformity was deteriorated.

In Comparative Examples 3 to 8 where the preliminary aging was carried out at the treatment temperature of from 300 to 400° C., the heating time of preliminary aging did not satisfy the above equation (4).

DESCRIPTION OF REFERENCE NUMERALS 1 autofocus camera module
2 yoke
3 lens
4 magnet
5 Carrier
6 coil
7 base
8 frame
9a spring member on upper side
9b spring member on lower side
10a, 10b cap

The invention claimed is:

1. A titanium copper foil comprising from 1.5% by mass to 5.0% by mass of Ti and from 10 ppm by mass to 3000 pm by mass of Fe, the titanium copper having a tensile strength of 1100 MPa or more in each of directions parallel to a rolling plane: a direction parallel to a rolling direction, a direction perpendicular to the rolling direction, and a direction of 45° relative to the rolling direction, and the balance being Cu and inevitable impurities, wherein the titanium copper foil has crystal orientation having A of from 10 to 40, in which A is represented by the following equation (1) when measuring a rolled surface by an X-ray diffraction method:

$$A = \beta\{220\}/(\beta\{200\}+\beta\{311\}) \quad \text{Equation (1)}$$

in which the β {220}, the β {200}, and the β {311} represent half-value widths of X-ray diffraction peaks at a {220} crystal plane, a {200} crystal plane, and a {311} crystal plane, respectively.

2. The titanium copper foil according to claim 1, wherein the A is from 12 to 38.

3. The titanium copper according to claim 1, wherein a difference between a maximum value and a minimum value of tensile strengths in directions parallel to a rolling plane: a direction parallel to a rolling direction, a direction perpendicular to the rolling direction, and a direction of 45° relative to the rolling direction is 400 MPa or less.

4. The titanium copper foil according to claim 1, wherein the titanium copper foil has a thickness of 0.1 mm or less.

5. The titanium copper according to claim 4, further comprising one or more elements selected from Ag, B, Co, Mg, Mn, Mo, Ni, P, Si, Cr, and Zr in a total amount of 1.0% by mass or less.

6. A copper rolled product comprising the titanium copper foil according to claim 1.

7. An electronic device part comprising the titanium copper foil according to claim 1.

8. The electronic device part according to claim 7, wherein the electronic device part is an autofocus camera module.

9. An autofocusing camera module comprising: a lens; a spring member for elastically biasing the lens to an initial position in an optical axis direction;
and an electromagnetic driver configured to generate electromagnetic force for withstanding a biasing force of the spring member so that the lens can be driven in the optical axis direction, wherein the spring member comprises the titanium copper foil according to claim 1.

* * * * *

UNITED STATES PATENT AND TRADEMARK OFFICE
CERTIFICATE OF CORRECTION

PATENT NO. : 12,000,029 B2
APPLICATION NO. : 17/291706
DATED : June 4, 2024
INVENTOR(S) : Kenta Tsujie Page 1 of 1

It is certified that error appears in the above-identified patent and that said Letters Patent is hereby corrected as shown below:

In the Claims

Column 20, Line 3, Claim 3 "copper according" should be -- copper foil according --.

Column 20, Line 11, Claim 5 "copper according" should be -- copper foil according --.

Signed and Sealed this
Eleventh Day of February, 2025

Coke Morgan Stewart
*Acting Director of the United States Patent and Trademark Office*